United States Patent
Wang et al.

(10) Patent No.: US 7,562,139 B2
(45) Date of Patent: Jul. 14, 2009

(54) SYSTEM AND METHOD FOR LOGGING EVENTS OF NETWORK DEVICES

(75) Inventors: Jain-Chung Wang, Tu-cheng (TW); Chuan-Cheng Hsu, Tu-cheng (TW); Jian-An Chen, Tu-cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 829 days.

(21) Appl. No.: 11/094,023

(22) Filed: Mar. 30, 2005

(65) Prior Publication Data
US 2005/0198281 A1 Sep. 8, 2005

(30) Foreign Application Priority Data
Feb. 4, 2004 (TW) ............................... 93109179 A

(51) Int. Cl.
*G06F 15/16* (2006.01)
(52) U.S. Cl. .................. 709/224; 709/223; 709/203; 707/104.1; 714/20; 726/25
(58) Field of Classification Search ......... 709/223–224, 709/203; 707/104.1; 726/25; 714/20
See application file for complete search history.

(56) References Cited
U.S. PATENT DOCUMENTS

| | | | | |
|---|---|---|---|---|
| 3,824,532 | A * | 7/1974 | Vandierendonck | 367/136 |
| 5,867,659 | A * | 2/1999 | Otteson | 709/224 |
| 6,173,418 | B1 * | 1/2001 | Fujino et al. | 714/20 |
| 6,385,609 | B1 * | 5/2002 | Barshefsky et al. | 707/6 |
| 6,505,245 | B1 * | 1/2003 | North et al. | 709/223 |
| 6,865,508 | B2 * | 3/2005 | Ueki et al. | 702/181 |
| 6,988,208 | B2 * | 1/2006 | Hrabik et al. | 726/23 |
| 7,032,101 | B2 * | 4/2006 | Gschwind et al. | 712/214 |
| 7,039,953 | B2 * | 5/2006 | Black et al. | 726/14 |
| 7,047,288 | B2 * | 5/2006 | Cooper et al. | 709/223 |
| 7,127,743 | B1 * | 10/2006 | Khanolkar et al. | 726/23 |
| 7,278,160 | B2 * | 10/2007 | Black et al. | 726/23 |
| 7,359,935 | B1 * | 4/2008 | Karipides et al. | 709/203 |
| 7,418,733 | B2 * | 8/2008 | Connary et al. | 726/25 |
| 2002/0012011 | A1 * | 1/2002 | Roytman et al. | 345/736 |
| 2002/0143917 | A1 * | 10/2002 | Stevenson et al. | 709/223 |
| 2003/0182418 | A1 * | 9/2003 | Feldman et al. | 709/224 |
| 2003/0220940 | A1 * | 11/2003 | Futoransky et al. | 707/104.1 |
| 2005/0114739 | A1 * | 5/2005 | Gupta et al. | 714/39 |

FOREIGN PATENT DOCUMENTS
CN 1394034 A 1/2003

* cited by examiner

*Primary Examiner*—Alina N. Boutah

(57) ABSTRACT

A system for logging events of network devices includes an event management module (110), an event forwarding module (120), a plurality of service modules (130), an event storing module (150), and a user interface (160). The event management module includes an event buffer (111). The service modules generate various events and classify them. Based on a callback function, the event forwarding module collects classified events and sends them to the event management module. The event management module stores events in the event storing module, and provides the events to the user interface for display according to a predefined filtering mechanism. A method for logging events of network devices is also disclosed.

12 Claims, 2 Drawing Sheets

SYSTEM AND METHOD FOR LOGGING EVENTS OF NETWORK DEVICES

BACKGROUND OF THE INVENTION

1. Field of the Invention

The present invention relates to a computer-enabled log recording system and method, and particularly to a system and method for logging events to manage network devices and configure the network devices by analyzing the events.

2. Related Art

With the rapid development and widespread application of electronic communications networks, more and more people are employing networks for business services and information exchange. The safe and smooth operation of a typical network relies on the provision of different services by various web servers. The services include browsing of web pages, transmission of File Transfer Protocol (FTP) files, discussion of news, and dynamic configurations of Internet Protocol (IP) addresses.

Driven by demand for the above-mentioned applications, networks are being developed in almost every corner of the globe. Effectively managing and configuring various devices connected on these networks is becoming an increasingly important and demanding task for network managers. To effectively manage and configure the various devices, the network managers often have to know the exact operation statuses of the devices. Conventionally, the operation statuses are reflected by events that occur in the devices. Therefore, obtaining and analyzing the events of each device can greatly help the managers to efficiently manage the device. For example, China Patent Publication No. CN1317745A discloses an apparatus and method for storing log data in a communication network, in which the log data are stored in a single-time writable medium such as a compact disk-recorder (CD-R), or a digital versatile disk-recorder (DVD-R). In such a system, an unauthorized user cannot change or delete the log data. Such an apparatus and method may, in some systems, efficiently prevent the original log data from being altered.

Although the above-mentioned system provides a security solution to protect log data, it does not provide managers with useful information to manage and configure the network devices. Therefore, a system and method is needed for obtaining log events from various devices on networks, and for providing the log events to managers according to practical requirements.

SUMMARY

A log event management system is provided for logging events of network devices which can assist managers to manage the network devices. One embodiment also provides a method for logging events of network devices.

In a preferred embodiment, the log event management system includes a user interface; a plurality of service modules for generating various log events; an event forwarding module for collecting the log events; an event management module for registering a callback function in the event forwarding module to collect log events, and for providing log events for the user interface; and an event storage module for storing log events. The log events may be classified into an information class, a notification class, an alert class, and a criticality class. The user interface displays the log events of different classes according to a predefined filtering mechanism.

In another embodiment, the present invention provides a log event management method for managing events in a network device. Such events may be generated by a plurality of service modules in the network device. A preferred method includes the steps of: (i) classifying the events into different classes, the classes being ranked as having different levels; (ii) registering a callback function for collecting the events generated in the network device; (iii) receiving the events; (iv) determining whether a user instruction to display the events has been received, the user instruction including a demand for defining a filtering mechanism for displaying the events; and (v) displaying one or more events according to the predefined filtering mechanism.

Other advantages and novel features of the present invention will become more apparent from the following detailed description of preferred embodiments when taken in conjunction with the accompanying drawings, in which:

DETAILED DESCRIPTION OF PREFERRED EMBODIMENTS

Figure 1:
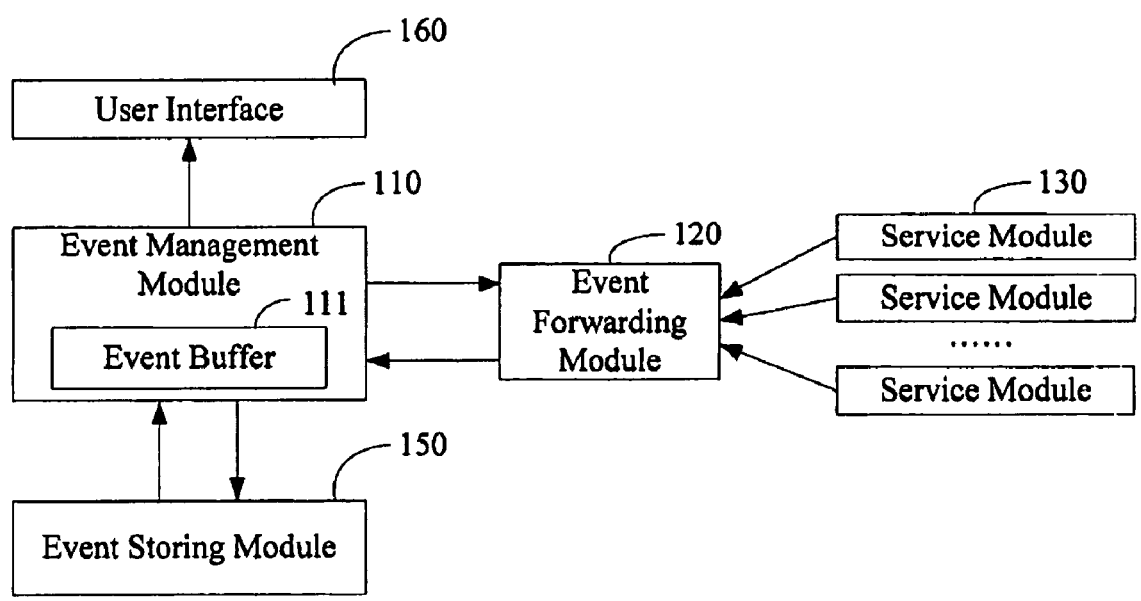
FIG. 1 is a schematic diagram of an architecture of a system for logging events of network devices in accordance with a preferred embodiment of the present invention.

FIG. 1 is a schematic diagram of a system for logging events of network devices in accordance with the preferred embodiment of the present invention. In this embodiment, the system includes an event management module 110, an event forwarding module 120, a plurality of service modules 130, an event storage module 150, and a user interface 160. The event management module 110 includes an event buffer 111.

In this embodiment, the service modules 130 may be software or firmware running on a light-emitting diode (LED) module, a driver, or another kind of functional module. Each service module 130 generates log events and classifies the log events into different classes. The classes of log events include an information class, a notification class, an alert class and a criticality class, which are ranked in that order from low to high in level. That is, the information class is in the lowest level, and the criticality class is in the highest level. An information class event refers to a running event of the network device. A notification class event refers to a configuration event of the network device. An alert class event refers to an event that disturbs the network device. A critical class event refers to an event that can lead to breakdown of the network device. Other classes may be used that describe information from a network device useful in network management. The event forwarding module 120 is provided for collecting events sent by the service modules 130, and for sending the collected events to the event management module 110 according to special requirements of the event management module 110.

In this preferred embodiment, the event management module 110 is a core module of the system. The event management module 110 maintains the event buffer 111 therein, and registers a callback function in the event forwarding module 120. Based on the callback function, the event forwarding module 120 collects and sends events to the event buffer 111. The event management module 110 further provides an indication of events to the user interface 160 according to a predefined filtering mechanism. In a preferred embodiment of the present invention, there are four filtering mechanisms corresponding to the four classes of events respectively. For example, when a filtering mechanism corresponding to a class of a low level applies, the event management module 110 provides all events with class levels equal to or higher than that low level. Other sets of classes may be used in other preferred embodiments of the present invention. A default filtering mechanism of the system is an information class filtering mechanism, which provides information class events to the user interface 160. In this case, all events of the information class, the notification class, the alert class and the criticality class are provided to the user interface 160. Preferably, a user can change the default filtering mechanism to a notification class filtering mechanism, an alert class filtering mechanism, or a criticality class filtering mechanism. Under the notification class filtering mechanism, the event management module 110 provides all events of the notification class, the alert class and the criticality class to the user interface 160. Under the alert class filtering mechanism, the event management module 110 provides all events of the alert class and the criticality class to the user interface 160. Under the criticality class filtering mechanism, the event management module 110 only provides events of the criticality class to the user interface 160.

The event buffer 111 in the event management module 110 of this embodiment is provided for storing the events temporarily. In one preferred embodiment, the event buffer 111 can record a fixed number of events, such as, for example, 2,000. When the event buffer 111 is full, a newest event overwrites the oldest one. The event buffer 111 can be reset by the event management module 110, by clearing all events therein. Other buffering designs may be used in other preferred embodiment of the present invention.

This embodiment also includes an event storage module 150 for storing events for a long time. When a network device experiences problems, the events in the event storing module 150 can be retrieved in order to analyze the cause of the problems.

This embodiment further includes the user interface 160, which is provided for the user to communicate with the network device. The user interface 160 may be a command line interface (CLI) or a web interface, for example, preferably, the user interface 160 is a CLI. Through the user interface 160, a user can alter the filtering mechanisms.

Figure 2:
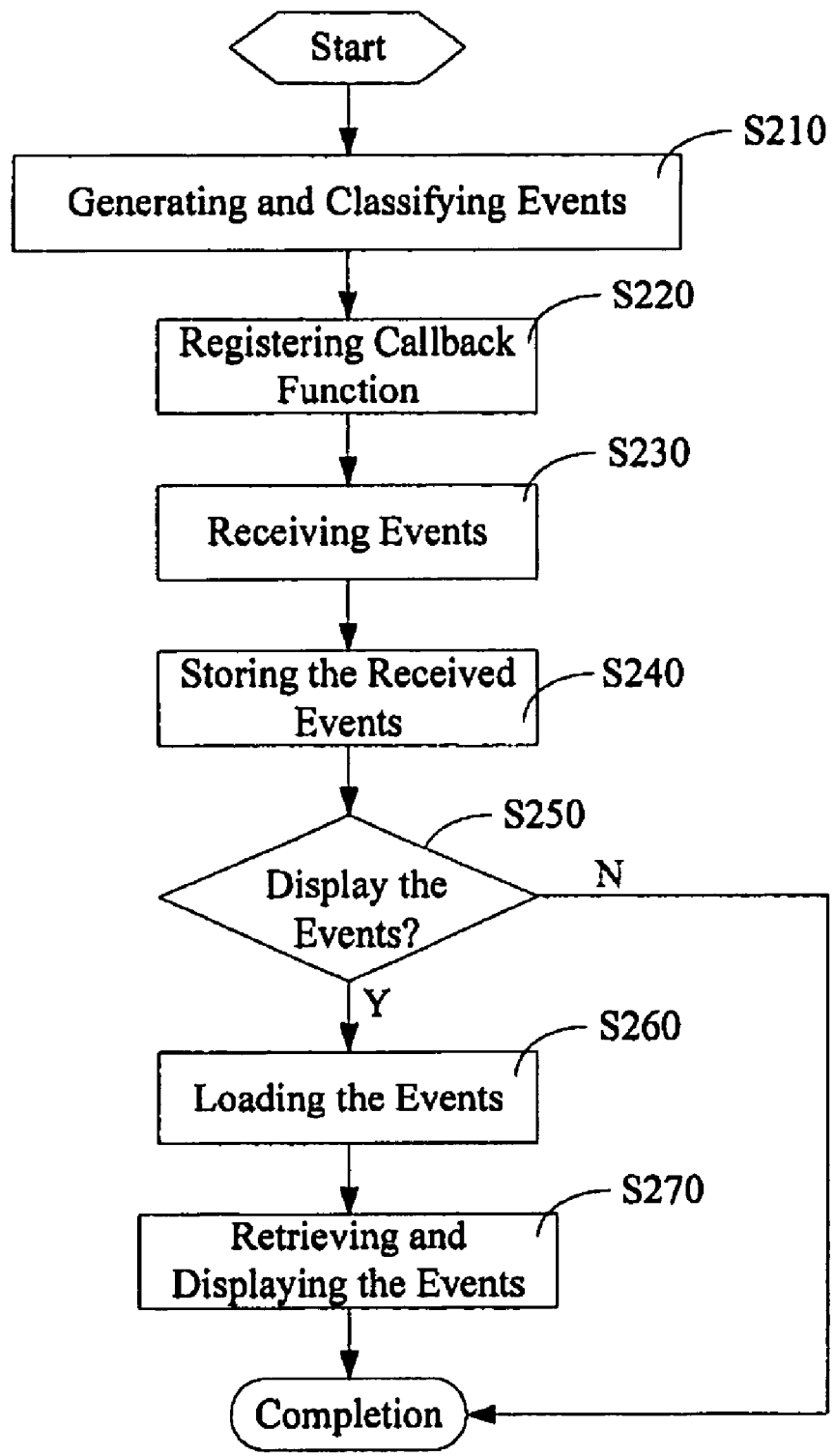
FIG. 2 is a flow chart of logging events of network devices and providing the events to managers for managing the network devices, in accordance with a preferred embodiment of the present invention.

FIG. 2 is a flow chart of logging events of network devices and providing the events to managers for managing the network devices, in accordance with the preferred embodiment of the present invention. At step S210, the service module 130 generates a plurality of events, and classifies the events into different classes. For example, a heat sink generates an overheat alert message, and classifies the overheat alert message as an alert class event. At step S220, the event management module 110 registers a callback function in the event forwarding module 120. Thus the event forwarding module 120 collects the events from the service module 130 based on the callback function. According to the callback function, said overheat alert message is sent to the event management module 110. At step S230, the event management module 110 receives the events. At step S240, the event management module 110 stores the received events in the event storage module 150.

At step S250, the event management module 110 determines whether it has received an instruction for displaying the events. The instruction includes a demand for defining the filtering mechanism. If the event management module 110 has not received such instruction, the procedure is completed.

If the event management module 110 has received such instruction, at step S260, the event management module 110 loads the events in the event storage module 150 based on the current filtering mechanism, and caches the events in the event buffer 111. At step S270, the user interface 160 retrieves the events from the event buffer 111 according to a selected filtering mechanism, and displays them to the user.

It is believed that the present invention and its advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

We claim that:

1. A log event management system stored in and running on a network device for managing events in the network device, comprising:
   a plurality of service modules for generating various log events, and classifying the log events into different classes, the different classes being ranked as having different levels;
   an event forwarding module for collecting the log events;
   an event management module for registering a callback function in the event forwarding module to collect the log events; and
   an event storage module for storing the log events;
   a user interface for displaying the log events of different classes according to the respective classes of the log events; and
   wherein the classes comprises a first class of running events of the network device, a second class of configuration events of the network device, a third class of events that disturb the network device, and a fourth class of events that can lead to breakdown of the network device, wherein the second class has a level higher than a level of the first class, the third class has a level higher than the level of the second class, and the fourth class has a level higher than the level of the third class.

2. The log event management system as recited in claim 1, wherein the event management module comprises an event buffer for temporarily caching the collected log events.

3. The log event management system as recited in claim 1, wherein the user interface is a command line interface or a web interface.

4. The log event management system as recited in claim 1, wherein the event management module defines a filtering mechanism to control the events provide for the user interface.

5. The log event management system as recited in claim 4, wherein the filter mechanism is configurable according to respective classes of the events.

6. A computer-enabled method for managing log events in one or more network devices, the events being generated by one or more service modules associated with selected of the one or more network devices, the method comprising:
   (a) the service modules for classifying the events into different classes, the classes being ranked as having different levels;
   (b) an event management module for registering a callback function for collecting the events generated in the network device;
   (c) the event management module for receiving the events;
   (d) the event management module for determining whether to display the events; and
   (e) a user interface for displaying one or more of the events according to the respective classes of the log events;

wherein the classes comprises a first class of running events of the network device, a second class of configuration events of the network device, a third class of events that disturb the network device, and a fourth class of events that can lead to breakdown of the network device, wherein the second class has a level higher than a level of the first class, the third class has a level higher than the level of the second class, and the fourth class has a level higher than the level of the third class.

7. The log event management method as recited in claim 6, wherein step (d) comprises the step of the event management module receiving a user instruction to display the events.

8. The log event management method as recited in claim 7, wherein the user instruction comprises a demand for defining a filtering mechanism for displaying the events.

9. The log event management method as recited in claim 8, wherein the defined filtering mechanism corresponds to one of the classes.

10. The log event management method as recited in claim 6, further comprising the step of a storage module storing one or more of the events.

11. A method for managing log events of a network having a plurality of network devices, comprising:

- a service module generating said log events related to selective ones of said plurality of network devices of said network;
- an event management module ranking said log events into at least two different classes;
- an event forwarding module collecting said ranked log events from said network;
- an event storing module storing said ranked log events; and
- a user interface displaying said ranked log events to users based on said ranked log events in said at least two classes and available ranking instructions from said users;
- wherein said at least two classes comprises a first class of running events of the network device, a second class of configuration events of the network device, a third class of events that disturb the network device, and a fourth class of events that can lead to breakdown of the network device, wherein the second class has a level higher than a level of the first class, the third class has a level higher than the level of the second class, and the fourth class has a level higher than the level of the third class.

12. The method as recited in claim 11, wherein said event management module defines a filtering mechanism to control said ranked log events provided for said user interface.

\* \* \* \* \*